United States Patent
Romani et al.

(10) Patent No.: US 10,086,701 B2
(45) Date of Patent: Oct. 2, 2018

(54) METHOD AND SYSTEM FOR DRIVER ASSISTANCE IN A VEHICLE

(71) Applicant: Ferrari S.p.A., Modena (IT)

(72) Inventors: Maximilian Romani, Modena (IT); Roberto Montanari, Scandiano (IT); Lorenzo Romani, Reggio Emilia (IT); Fabio Pagliai, Polinago (IT)

(73) Assignee: Ferrari S.p.A., Modena (IT)

( * ) Notice: Subject to any disclaimer, the term of this patent is extended or adjusted under 35 U.S.C. 154(b) by 93 days.

(21) Appl. No.: 15/341,289

(22) Filed: Nov. 2, 2016

(65) Prior Publication Data

US 2017/0120750 A1     May 4, 2017

(30) Foreign Application Priority Data

Nov. 3, 2015   (IT) .................. 102015000068484

(51) Int. Cl.
*B60K 35/00* (2006.01)
*B60W 50/00* (2006.01)
*B60K 37/02* (2006.01)

(52) U.S. Cl.
CPC .............. *B60K 35/00* (2013.01); *B60K 37/02* (2013.01); *B60W 50/0097* (2013.01); *B60K 2350/1064* (2013.01); *B60K 2350/1072* (2013.01); *B60K 2350/1092* (2013.01); *B60K 2350/206* (2013.01); *B60K 2350/402* (2013.01); *B60K 2350/408* (2013.01)

(58) Field of Classification Search
CPC .. B60K 35/00; B60K 37/02; B60K 2350/408; B60K 2350/206; B60K 2350/1064; B60K 2350/402; B60K 2350/1092; B60K 2350/1072; B60W 50/0097
See application file for complete search history.

(56) References Cited

U.S. PATENT DOCUMENTS

| | | | |
|---|---|---|---|
| 7,079,018 B2* | 7/2006 | Hottebart | G01D 7/002 116/34 B |
| 9,205,740 B2* | 12/2015 | Jacobi | B60K 26/021 |
| 9,776,643 B2* | 10/2017 | Skaff | B60W 50/14 |
| 9,836,574 B2* | 12/2017 | Willard | G06F 17/5095 |

(Continued)

FOREIGN PATENT DOCUMENTS

| | | |
|---|---|---|
| DE | 101 09 905 A1 | 8/2002 |
| JP | 2008-143394 A | 6/2008 |
| WO | WO 2009/038502 A1 | 3/2009 |

*Primary Examiner* — Alan D Hutchinson
(74) *Attorney, Agent, or Firm* — Blank Rome LLP

(57) ABSTRACT

Method and system for driver assistance in a vehicle; the current value of a driving variable correlated with the driving of the vehicle is determined; an optimal value of the driving variable in the future and after a given amount of time has elapsed since the current instant starting from the current state of the vehicle is determined and supposing an excellent action upon the driving controls of the vehicle; an expected value of the driving variable in the future and after the given amount of time has elapsed since the current instant starting from the current state of the vehicle is determined and supposing a constant action upon the driving controls of the vehicle; and the current value, the expected value and the optimal value of the driving variable are displayed together in an instrument of the instrument panel of the vehicle.

11 Claims, 5 Drawing Sheets

(56) References Cited

U.S. PATENT DOCUMENTS

2009/0243827 A1* 10/2009 Burke .................... G01D 11/28
340/439
2012/0197501 A1* 8/2012 Sujan ..................... B60K 23/00
701/51

* cited by examiner

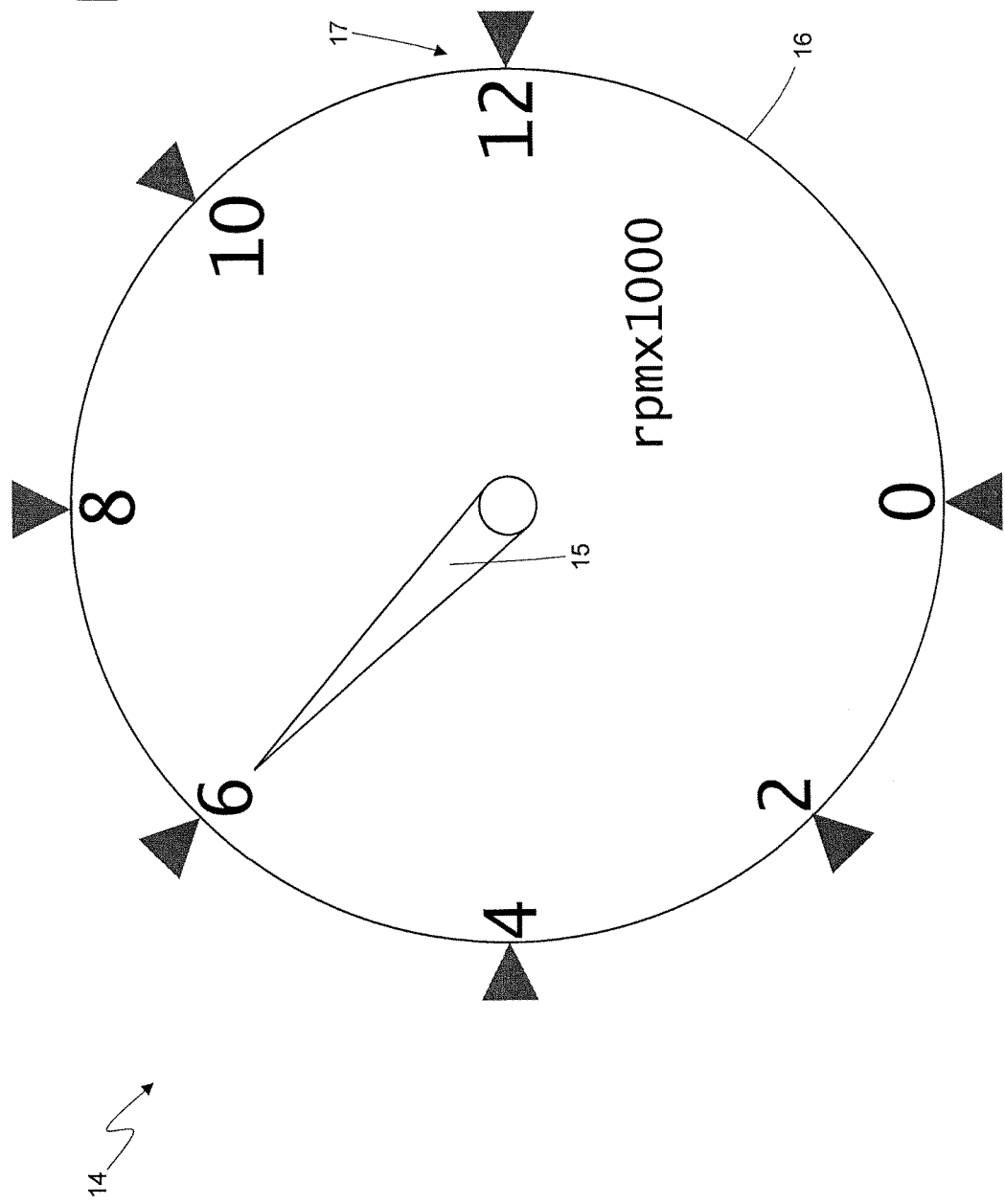

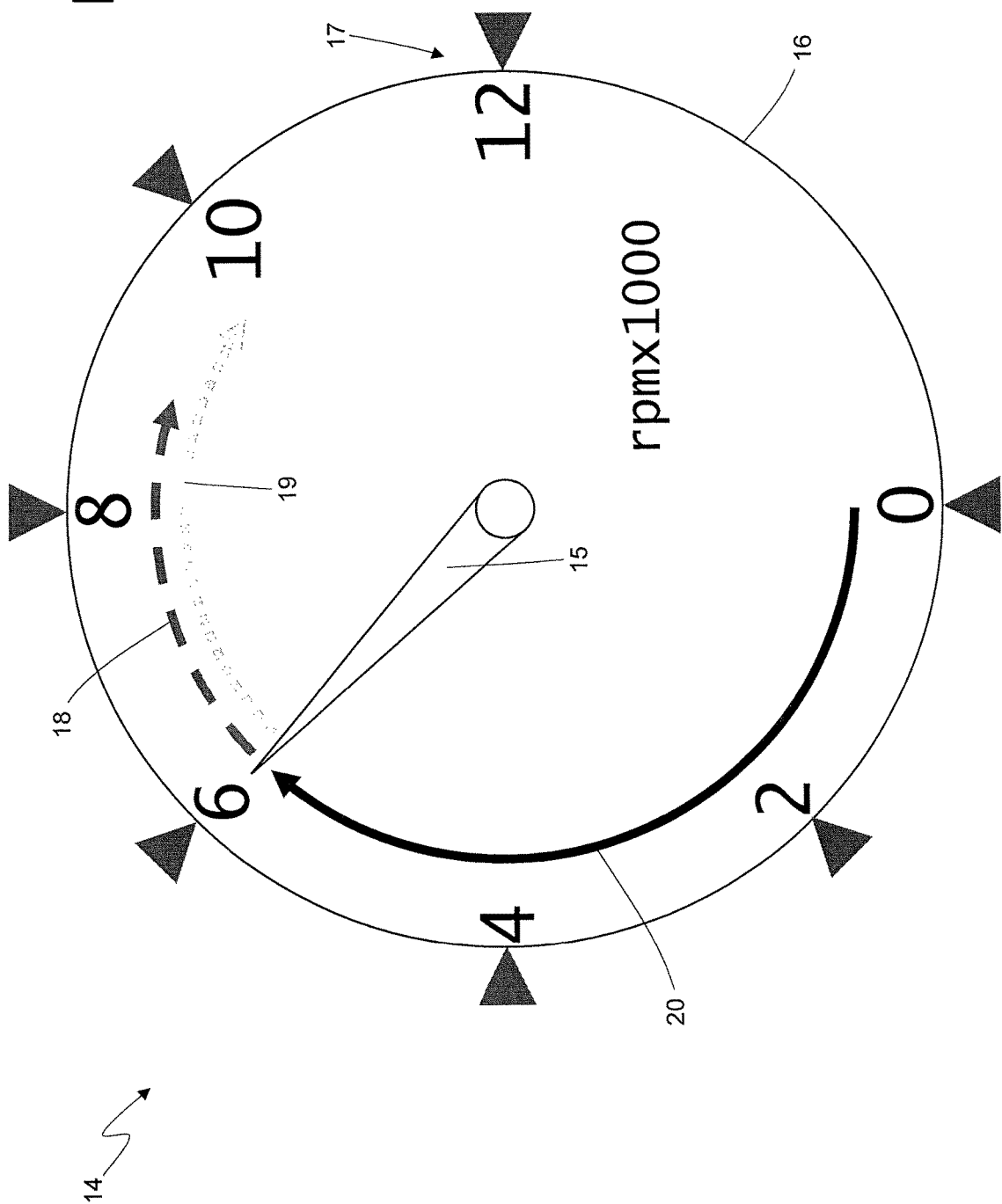

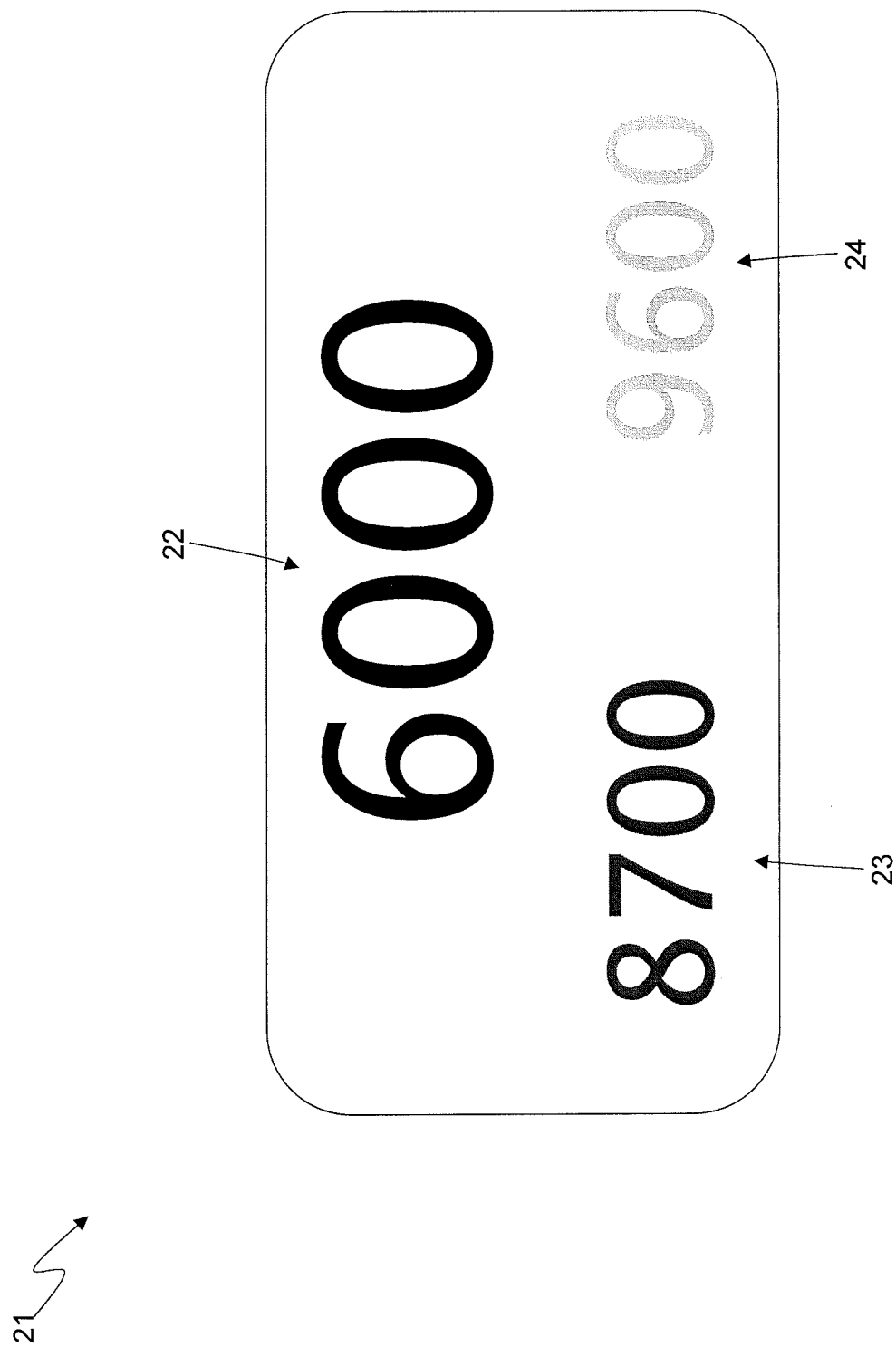

METHOD AND SYSTEM FOR DRIVER ASSISTANCE IN A VEHICLE

TECHNICAL FIELD

The present invention relates to a method and to a system for driver assistance in a vehicle.

The present invention finds advantageous application to the driver assistance in a automobile, to which the following description will make explicit reference without implying any loss of generality.

PRIOR ART

The instrument panel of a modern automobile comprises several instruments, each of which displays the current value (measured by a suitable sensor) of a corresponding driving variable (mainly, but not only, the number of revolutions of the engine and the speed of the automobile).

The knowledge of the current value of the driving variables (mainly, but not only, the number of revolutions of the engine and the speed of the automobile) is important to allow the driver to drive the automobile in the correct manner (for example to avoid making the engine run too slowly or too fast) and is normally more than enough when driving on roads open to traffic (i.e. in the event of non-performance driving, respecting the limits imposed by the highway code). However, in case of performance driving on a racetrack, the non-professional driver often fails to achieve the desired performance since the driver alone is not able to correctly exploit the limits of the automobile.

The patent application DE10109905A1 and the patent application JP2008143394A1 describe a method for driver assistance in a vehicle comprising the steps of: determining the current value of a driving variable (in particular the speed) correlated with the driving of the vehicle; determining an expected value (non optimal) of the driving variable in the future and after a given amount of time has elapsed since the current instant starting from the current state of the vehicle and supposing a constant action (non optimal) upon the driving controls of the vehicle; and displaying the expected value (non optimal) of a driving variable in an instrument of the instrument panel of the vehicle in addition to the current value of the driving variable.

The patent application WO2009038502A1 describes a method for driver assistance in a vehicle comprising the steps of: determining the current value of a driving variable (in particular the speed) correlated with the driving of the vehicle; determining a predetermined value of the driving variable; and displaying in an instrument of the instrument panel of the vehicle, in addition to the current value of the driving variable, the spread between the current value and the predetermined value of the driving variable by means of a particular colouring of the background (i.e. in a qualitative and not quantitative way).

DESCRIPTION OF THE INVENTION

The object of the present invention is to provide a method and a system for driver assistance in a road vehicle providing a greater support to the driver so as to correctly approach the limits of the road vehicle (particularly in case of performance driving on a racetrack) and are at the same time simple and inexpensive to implement.

According to the present invention, a method and a system for driver assistance in a vehicle are provided, as claimed in the appended claims.

BRIEF DESCRIPTION OF THE DRAWINGS

The present invention will now be described with reference to the accompanying drawings, which illustrate some examples of non-limiting embodiments, wherein:

FIG. 3 is a schematic front view of an instrument displayed in the digital screen of FIG. 2;

FIG. 4 is a further schematic front view of the instrument of FIG. 3; and

FIG. 5 is a schematic front view of a different embodiment of the instrument of FIGS. 3 and 4.

PREFERRED EMBODIMENTS OF THE INVENTION

Figure 1:
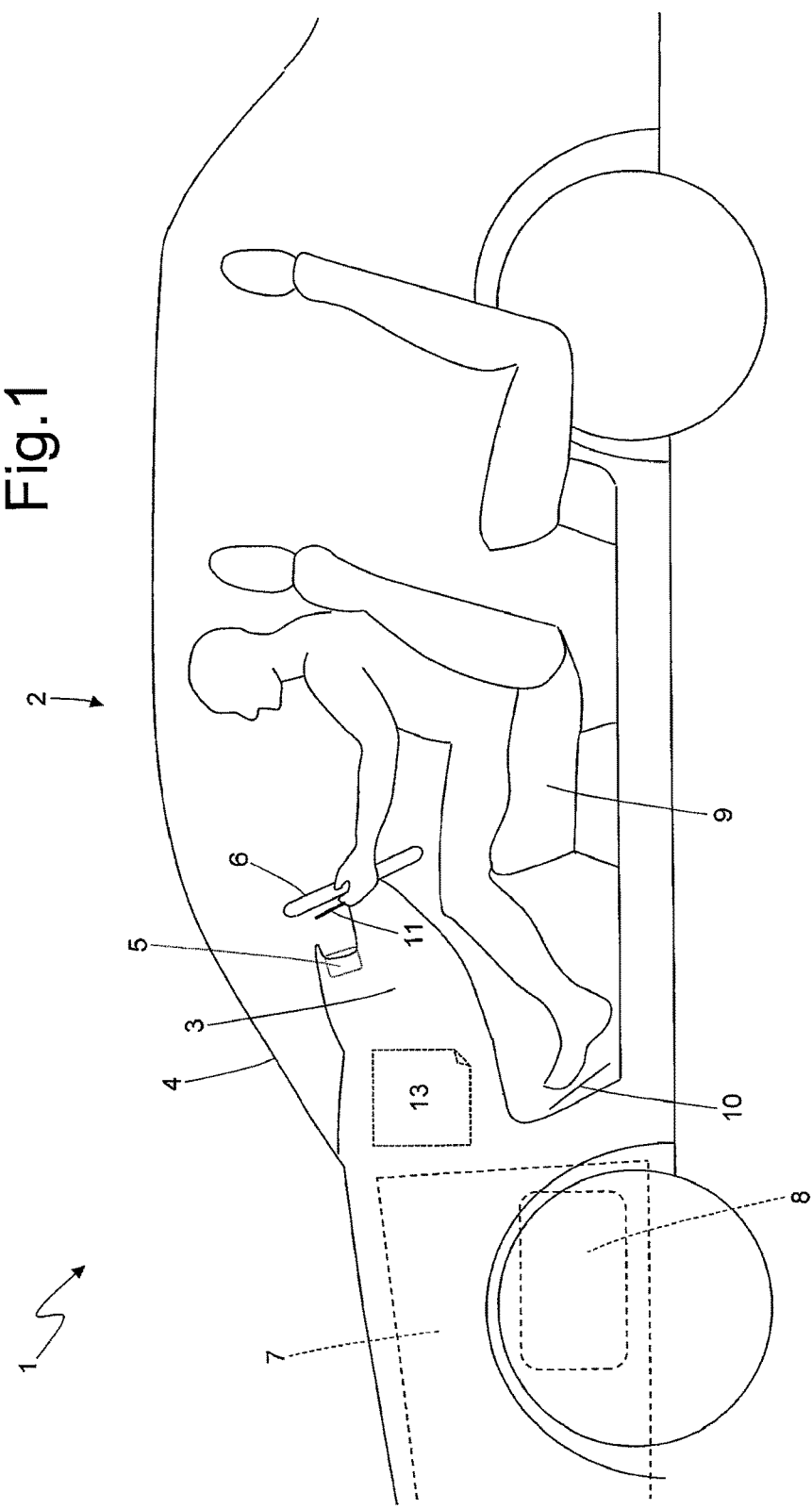
FIG. 1 is a schematic view of a automobile which implements the driver assistance method made according to the present invention.

In FIG. 1, number 1 denotes as a whole a automobile comprising a passenger compartment 2 delimited at the front by a dashboard which is arranged below a windscreen 4. The dashboard 3 supports an instrument panel 5, which is arranged in front of the driver immediately behind a steering wheel 6. Preferably, the automobile 1 comprises a thermal internal combustion engine which is connected to the drive wheels through a power-assisted gearbox 8 (i.e. a gearbox in which the actions are carried out by electronically controlled actuators). In front of the driver seat 9 two pedals 10 (i.e. the accelerator pedal and the brake pedal which are schematically illustrated in FIG. 1) are arranged, while behind the steering wheel 6 two levers 11 (schematically illustrated in FIG. 1) are arranged which respectively control the upper gear shift and the lower gear shift in the power-assisted gearbox 8. The steering wheel 6, the pedals 10 and the blades 11 are the driving controls of the automobile 1, i.e. the controls by which the driver drives the automobile 1.

Figure 2:
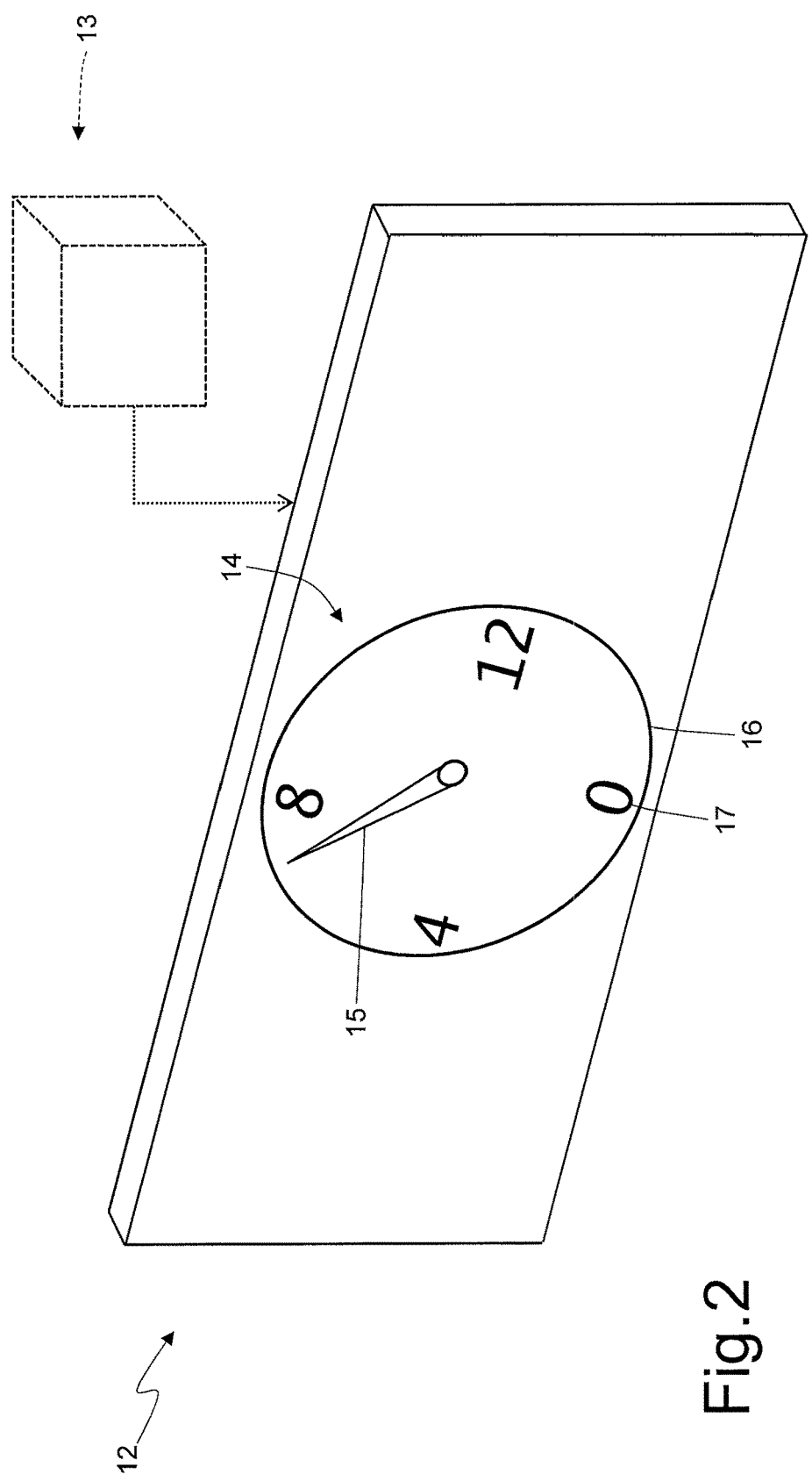
FIG. 2 is a perspective and schematic view of a digital screen of an instrument panel of automobile of FIG. 1.

As illustrated in FIG. 2, the instrument panel 5 comprises a digital screen 12, which is controlled by a control unit 13 and is fully programmable (i.e. can be programmed to display any type of information). In particular, the digital screen 12 can be controlled to display a pointer instrument 14 (i.e. an instrument that uses a mobile pointer to indicate a measurement) in which a pointer 15 (i.e. the image of a pointer, as the pointer instrument 14 is a graphic representation displayed in the digital screen 12) moves within a circular dial 16 (i.e. the image of a circular dial, as the pointer instrument 14 is a graphic representation displayed in the digital screen 12). The dial 16 is provided with a fractional scale 17 which provides the measuring scale of the pointer instrument 14, i.e. provides the fractional quantification of the measurement indicated by the pointer 15.

In the embodiment illustrated in FIG. 2, the whole pointer instrument 14 is an image displayed by the digital screen 12 (i.e. the whole pointer instrument 14 is a digital image displayed by the digital screen 12). According to a possible alternative not illustrated, the pointer 15 and at least part of the dial 16 of the pointer instrument 14 may be physical elements that are superimposed over the digital screen 12: the pointer 15 and the dial 16 of the pointer instrument 14 may be arranged in front of the digital screen 12 (in this case the dial 16 is limited to an internally hollow ring inside which the pointer 15 moves) or the pointer 15 and the dial 16 of the pointer instrument 14 may be arranged behind the digital screen (in this case the digital screen 12 is at least partially transparent to show the underlying pointer 15 and dial 16 of the pointer instrument 14).

In the embodiment illustrated in the attached figures, the pointer instrument 14 is a tachometer, i.e. displays the rotation speed of the thermal internal combustion engine 7. In use, the control unit 13 determines the current value of the engine speed (preferably using the measurement provided by an angular encoder coupled to a motor shaft of the thermal internal combustion engine 7) and controls the pointer instrument 14 to display the current value of the engine speed (in particular, the pointer 15 indicates on the fractional scale 17 the current value of the engine speed). In FIG. 3, the totally conventional operation of the pointer instrument 14 is illustrated, wherein the pointer instrument 14 itself indicates only the current value of the engine speed. In FIG. 4, the innovative operation of the pointer instrument 14 is illustrated, wherein the pointer instrument 14 itself indicates, in addition to the current value of the engine speed, also an expected value in the near future, and an optimal value in the near future of the engine speed.

In use, the control unit 13 determines an optimal value of the engine speed in the future and after a given amount of time has elapsed (normally ranging from 0.5 to 5 seconds) from the current instant starting from the current state of the automobile 1 and supposing an excellent action upon the driving controls of the automobile 1 (i.e. by applying corrections to the driving controls that allow to maximize performance taking the automobile 1 near to its limits). Furthermore, in use, the control unit 13 determines an expected value of the engine speed in the future and after a given amount of time has elapsed since the current instant (the exact same given amount of time used to determine the optimal value) starting from the current state of the automobile 1 and supposing a constant action upon the driving controls of the automobile 1 (i.e. keeping unchanged the driving controls). Consequently, and as illustrated in FIG. 4, the control unit 13 controls the pointer instrument 14 to display the optimal value and the expected value in the near future of the engine speed in addition to the current value of the engine speed.

In other words, the control unit 13 implements a mathematical model which, starting from the current state of the automobile 1 provides the expected evolution (that is, the expected value) and the optimal evolution (that is, the optimal value) of the engine speed. Preferably, the mathematical model is determined or otherwise experimentally refined, i.e. extracted or refined by synthesizing a large amount of experimental measurements performed by means of laboratory instruments mounted on a test automobile 1. By way of example, the mathematical model which, starting from the current state of the automobile 1 provides the expected evolution (that is, the expected value) and the optimal evolution (that is, the optimal value) of the engine speed, could use the position of the accelerator pedal 10, an estimate of the driving wheel traction, the torque curve of the thermal internal combustion engine 7, the longitudinal and transverse accelerations of the automobile 1, the current gear engaged in the gearbox 8, the steering angle of the steering wheel 6, the temperature of the cooling liquid of the thermal internal combustion engine 7.

As previously mentioned, in the pointer instrument 14 the pointer 15 moves within the circular dial 16 provided with the fractional scale 17 so as to display (indicate) the current value of the engine speed. The expected value of the engine speed is displayed inside the dial 16 of the pointer instrument 14 by means of a line 18 which is shaped as a circular arc, begins immediately downstream of the pointer 15 and ends in correspondence to the expected value of the engine speed. The optimal value of the engine speed is displayed inside the dial 16 of the pointer instrument 14 by means of a line 19 which is shaped as a circular arc, begins immediately downstream of the pointer 15 and ends in correspondence to the optimal value of the engine speed. Preferably, the two lines 18 and 19 have different radii so as to be parallel and next to one another (i.e. to be at a certain distance one from the other different from zero).

According to a possible (and completely optional) embodiment illustrated in FIG. 4, the current value of the engine speed is displayed inside the dial 16 of the pointer instrument 14 also by means of a line 20 which is shaped as a circular arc and ends immediately upstream of the pointer 15; in other words, the line 20 is arranged to the left (that is, upstream) of the pointer 15, whereas the two lines 18 and 19 are arranged to the right (that is, downstream) of the pointer 15.

According to an alternative embodiment illustrated in FIG. 5, the digital screen 12 of the instrument panel 5 does not display the pointer instrument 14 (which, as mentioned earlier, is entirely virtual, i.e. is entirely composed of images displayed on the digital screen 12) and in its place displays a digital instrument 21 without pointers. In particular, the digital instrument 21 displays a number 22 indicating the current value of the engine speed, a number 23 indicating the expected value of the engine speed, and a number 24 indicating the optimal value of the engine speed; preferably, the three numbers 22, 23 and 24 have different colours and/or sizes.

Obviously, the conformation and/or the appearance of the instrument which displays the engine speed may be different, notwithstanding the fact that the instrument simultaneously displays the current value of the engine speed, the expected value of the engine speed, and the optimal value of the engine speed.

According to a different embodiment not illustrated and not part of the present invention, the pointer instrument 14 or the digital instrument 21 only displays the current value of the engine speed and the optimal value of the engine speed (that is, they do not display the expected value of the engine speed).

In the embodiment described above, the pointer instrument 14 or the digital instrument 21 displays the engine speed of the thermal internal combustion engine 7; alternatively, the pointer instrument 14 or the digital instrument 21 may display other driving variables (i.e. variables connected with the driving of the automobile 1) different from the engine speed such as, for example, the speed of the automobile 1, the gear engaged in the gearbox 8, and indicator of the performance (that is, a "judgment", a "score" which measures the quality of the performance with respect to the maximum achievable performance), the heartbeat of the driver, the consumption of fuel, the temperature of the brakes of the automobile 1, the longitudinal acceleration or deceleration of the automobile 1, the transverse acceleration of the automobile 1, or the engine speed (or other functional characteristics as the absorbed/generated electric power) of a possible electric machine connected to the driving wheels. Obviously, the length of the given amount of time which establishes when to determine, in the future, the expected value and the optimal value of the driving variable depends on the driving variable itself and in particular on the changing speed of the driving variable; for example, when the driving variable is the heartbeat of the driver the given amount of time is of the order of tens of seconds, whereas when the driving variable is the longitudinal acceleration or deceleration of the automobile 1 the given amount of time is of the order of a second.

The driver assistance system described above has many advantages.

First, the driver assistance system described above provides the driver with a valid support for correctly approaching the limits of the road vehicle (particularly in the case of performance driving on a racetrack). In fact, for each driving variable the current value is displayed (which allows to know where the automobile 1 is presently located), the expected value in the near future (which allows to know where the automobile 1 is going by continuing with the current action on the driving controls), and the optimal value in the near future (which allows to know where the automobile 1 should/could be taken by acting in the best, i.e. optimal, way on the driving controls): by observing the spread between the expected value and the optimal value in the near future the driver can correct an action on the driving controls in a simple, fast and intuitive manner in the attempt to match the expected value with the optimal value.

It is important to note that the spread between the expected value and the optimal value provides an indication not only qualitative (that is, on what to change with the action on the driving controls) but also quantitative (that is, how much to change the action on the driving controls): it is evident that if the spread between the expected value and the optimal value is modest the correction on the driving controls will be modest or equal to zero (normally it is more than enough to get close to the optimal value) whereas, if the spread between the expected value and the optimal value is high, the correction on the driving controls will be greater. In fact, by displaying only the optimal value the driver does not have a clear indication of how and when to change the action on driving controls to attempt achieving the optimal value.

It is important to note that by displaying the expected value and the optimal value in the near future the possibility to correct her/his own action on the driving controls is given to the driver so as to attempt to achieve, in the near future, the optimal value; in other words, in the event of significant spread between the expected value and the optimal value in the near future, the driver still has time and the opportunity to correct the action on the driving controls to attempt achieving the optimal value in the near future exactly because the expected value and the optimal value are a future projection and do not represent the present instant. Whereas, if the optimal current value were displayed (that is, in the present) the driver would not have any opportunity to correct the actions on the driving controls as any correction to the action on the driving controls has only effect on the future and not on the present.

In addition, the driver assistance system described above is simple and inexpensive to implement in a modern road vehicle, as it does not involve any type of hardware change (the current instrument panels already comprise digital screens) and is completely achievable by way of software changes.

Finally, the driver assistance system described above can be activated and (fully) deactivated on command and therefore can be used when and only upon request of the driver.

Obviously, the driver assistance system described above finds advantageous application in any type of road vehicle (e.g. a automobile or a motorcycle) or even non-road vehicle (e.g. earth-moving machines, farm equipment, aircraft, watercraft, . . . ).

The invention claimed is:

1. A method for driver assistance in a vehicle; the driver assistance method comprises the steps of:
   determining a current value of a driving variable correlated with the driving of the vehicle; and
   displaying the current value of the driving variable in an instrument of an instrument panel of the vehicle;
   determining an optimal value of the driving variable at a future time and after a given amount of time has elapsed since a current instant starting from a current state of the vehicle and assuming actions are applied to driving controls to maximize performance of the vehicle;
   determining an expected value of the driving variable in the future and after the given amount of time has elapsed since the current instant starting from the current state of the vehicle and assuming a constant action on the driving controls of the vehicle; and
   displaying the optimal value and the expected value of the driving variable in the instrument in addition to the current value of the driving variable.

2. The driver assistance method according to claim 1, wherein the instrument comprises a pointer moving inside a circular dial provided with a fractional scale and displays the current value of the driving variable.

3. The driver assistance method according to claim 2, wherein the expected value of the driving variable is displayed inside the dial of the instrument by means of a first line, which is shaped as a circular arc, begins immediately downstream of the pointer and ends in correspondence to the expected value of the driving variable.

4. The driver assistance method according to claim 3, wherein the optimal value of the driving variable is displayed inside the dial of the instrument by means of a second line, which is shaped as a circular arc, begins immediately downstream of the pointer and ends in correspondence to the optimal value of the driving variable.

5. The driver assistance method according to claim 4, wherein the two lines have different radii, so as to be parallel and next to one another.

6. The driver assistance method according to claim 4, wherein the current value of the driving variable is displayed inside the dial of the instrument also by means of a third line, which is shaped as a circular arc and ends immediately upstream of the pointer.

7. The driver assistance method according to claim 1, wherein the instrument is designed to display a first number indicating the current value of the driving variable, a second number indicating the expected value of the driving variable, and a third number indicating the optimal value of the driving variable.

8. The driver assistance method according to claim 7, wherein the three numbers have different colours or different sizes.

9. The driver assistance method according to claim 1, wherein the given amount of time ranges from 0.5 to 5 seconds.

10. The driver assistance method according to claim 1, wherein the driving variable alternatively is (i) number of revolutions per minute of an engine of the vehicle, (ii) speed of the vehicle, (iii) gear engaged in a gearbox of the vehicle, (iv) indicator of the performance, (v) heartbeat of the driver, (vi) consumption of fuel, (vii) temperature of vehicle brakes, (viii) longitudinal acceleration or deceleration of vehicle, or (ix) transverse acceleration of the vehicle.

11. A system for driver assistance in a vehicle; the driver assistance system comprises:

a control unit, which determines a current value of a driving variable correlated with the driving of the vehicle; and an instrument of an instrument panel of the vehicle, which displays the current value of the driving variable;

wherein the control unit determines an optimal value of the driving variable in a future and after a given amount of time has elapsed since a current instant starting from a current state of the vehicle and assuming actions are applied to driving controls to maximize performance of the road vehicle;

wherein the control unit determines an expected value of the driving variable in the future and after the given amount of time has elapsed since the current instant starting from the current state of the vehicle and assuming a constant action on the driving controls of the vehicle; and wherein the instrument displays the optimal value and the expected value of the driving variable in addition to the current value of the driving variable.

\* \* \* \* \*